(12) United States Patent
Mittal et al.

(10) Patent No.: US 11,169,999 B2
(45) Date of Patent: Nov. 9, 2021

(54) COMBINED SORT AND AGGREGATION

(71) Applicant: Oracle International Corporation, Redwood Shores, CA (US)

(72) Inventors: Ashish Mittal, Foster City, CA (US); Srinivas Vemuri, Santa Clara, CA (US); Kenneth Khiaw Hong Eng, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 101 days.

(21) Appl. No.: 16/854,397

(22) Filed: Apr. 21, 2020

(65) Prior Publication Data

US 2020/0250194 A1    Aug. 6, 2020

Related U.S. Application Data

(63) Continuation of application No. 15/951,002, filed on Apr. 11, 2018, now Pat. No. 10,691,695.
(Continued)

(51) Int. Cl.
  *G06F 16/2455*  (2019.01)
  *G06F 7/36*  (2006.01)
  (Continued)

(52) U.S. Cl.
  CPC .......... *G06F 16/24556* (2019.01); *G06F 7/36* (2013.01); *G06F 16/244* (2019.01); *G06F 16/24535* (2019.01); *G06F 16/24578* (2019.01)

(58) Field of Classification Search
  CPC .. G06F 16/24556; G06F 16/27; G06F 9/5066; G06F 16/24532; G06F 16/278; G06F 3/1213
  (Continued)

(56) References Cited

U.S. PATENT DOCUMENTS

| 4,611,280 A | 9/1986 | Linderman |
| 5,487,166 A | 1/1996 | Cossock |

(Continued)

OTHER PUBLICATIONS

Sorting Variable Length Records, IBM i7.2, Sorting and Merging Files, Available Online at: https://www.ibm.com/support/knowledgecenter/en/ssw_ibm_i_72/rzase/cblsortvarlen.htm, Accessed from Internet on Jul. 26, 2017, 1 page.
(Continued)

*Primary Examiner* — Hung T Vy
(74) *Attorney, Agent, or Firm* — Kilpatrick Townsend & Stockton LLP

(57) ABSTRACT

Innovative techniques are disclosed for performing a combined sort and aggregation operation involving eagerly performing aggregation while sorting. The techniques described herein enable an aggregation and a group-by operation to be performed using an amount of system memory that is far less than the system memory required to store all the data records being processed while minimizing the need to spill data to disk. This combined sort and aggregation operation has better performance than conventional techniques since system memory is used more efficiently. In certain embodiments, a combined sort and aggregation operation is disclosed that enables the efficient sorting and aggregation of data records when the desired aggregation function is composable (such as SUM, COUNT, MIN and MAX aggregate operations).

18 Claims, 12 Drawing Sheets

Related U.S. Application Data

(60) Provisional application No. 62/484,779, filed on Apr. 12, 2017.

(51) Int. Cl.
  *G06F 16/242* (2019.01)
  *G06F 16/2453* (2019.01)
  *G06F 16/2457* (2019.01)

(58) Field of Classification Search
  USPC .......................................... 707/736; 395/672
  See application file for complete search history.

(56) References Cited

U.S. PATENT DOCUMENTS

| | | | |
|---|---|---|---|
| 5,640,554 | A | 6/1997 | Take |
| 5,799,210 | A | 8/1998 | Cohen et al. |
| 5,850,547 | A | 12/1998 | Waddington et al. |
| 5,852,826 | A | 12/1998 | Graunke et al. |
| 5,951,658 | A | 9/1999 | Daray, Jr. et al. |
| 6,105,024 | A | 8/2000 | Graefe et al. |
| 7,409,517 | B2 | 8/2008 | Dageville et al. |
| 7,496,572 | B2 | 2/2009 | Blaicher |
| 7,590,620 | B1 * | 9/2009 | Pike .................... G06F 11/1482 |
| 7,725,900 | B2 | 5/2010 | Sauermann |
| 8,478,755 | B2 | 7/2013 | Lyon |
| 9,129,004 | B2 | 9/2015 | Yaroslavskiy et al. |
| 9,274,950 | B2 | 3/2016 | Graefe |
| 10,691,695 | B2 | 6/2020 | Mittal et al. |
| 10,732,853 | B2 | 8/2020 | Mittal et al. |
| 2003/0065688 | A1 | 4/2003 | Dageville et al. |
| 2004/0073763 | A1 | 4/2004 | Dageville et al. |
| 2006/0064535 | A1 | 3/2006 | Walker |
| 2006/0236046 | A1 | 10/2006 | Bowers |
| 2010/0174690 | A1 | 7/2010 | Marcotte |
| 2011/0055232 | A1 | 3/2011 | Graefe |
| 2012/0254173 | A1 | 10/2012 | Graefe |
| 2013/0185337 | A1 | 7/2013 | Lipcon |
| 2014/0006878 | A1 | 1/2014 | Kalluri et al. |
| 2017/0228319 | A1 * | 8/2017 | Mueller ................ G06F 16/248 |
| 2017/0235614 | A1 | 8/2017 | Choe et al. |
| 2017/0249359 | A1 * | 8/2017 | Abdelwahab ....... G06F 16/2365 |
| 2017/0359398 | A1 * | 12/2017 | Li ........................ H04L 65/602 |
| 2018/0150472 | A1 | 5/2018 | Chen et al. |

OTHER PUBLICATIONS

Sorting Variable-Length Records, CA VM:Sort™ -1.4—CA Technologies Documentation, Available Online at: https://docops.ca.com/ca-vm-sort/1-4/en/using/sorting-and-merging-files/sorting-variable-length-records, Accessed from Internet on Jul. 25, 2017, 1 page.

U.S. Appl. No. 15/945,637, First Action Interview Office Action Summary dated Nov. 29, 2019, 6 pages.

U.S. Appl. No. 15/945,637, First Action Interview Pilot Program Pre-Interview Communication dated Sep. 20, 2019, 4 pages.

U.S. Appl. No. 15/951,002, Notice of Allowance dated Mar. 5, 2020, 9 pages.

U.S. Appl. No. 15/960,385, First Action Interview Pilot Program Pre-Interview Communication dated Apr. 30, 2020, 5 pages.

Auger et al., Merge Strategies: from Merge Sort to TimSort, Available Online at: https://hal-upec-upem.archives-ouvertes.fr/hal-01212839v2/document, Dec. 9, 2015, 15 pages.

Rhone et al., User's Guide for Oracle Data Visualization, Oracle® Fusion Middleware, 12c (12.2.1.2.0), E70158-02, Available Online at: https://docs.oracle.com/middleware/12212/biee/BIVUG/BIVUG.pdf, Oct. 2016, 86 pages.

Sinha et al., Cache-Efficient String Sorting Using Copying, School of Computer Science and Information Technology, Available Online at: http://citeseerx.ist.psu.edu/viewdoc/download?doi=10.1.1.85.3498&rep=rep1&type=pdf, 2006, 29 pages.

U.S. Appl. No. 15/945,637, Notice of Allowance dated May 15, 2020, 7 pages.

* cited by examiner

| Run 1 | |
|---|---|
| Washington | 250 |
| California | 1000 |
| Oregon | 500 |
| California | 500 |
| Washington | 150 |
| Oregon | 200 |

| Run 2 | |
|---|---|
| Oregon | 100 |
| California | 800 |
| Oregon | 500 |
| California | 500 |
| Washington | 250 |

*FIG. 4A*

| Run 1 (Sorted) | |
|---|---|
| California | 1000 |
| California | 500 |
| Oregon | 500 |
| Oregon | 200 |
| Washington | 250 |
| Washington | 150 |

| Run 2 (Sorted) | |
|---|---|
| California | 800 |
| California | 500 |
| Oregon | 100 |
| Oregon | 500 |
| Washington | 250 |

FIG. 4B

Run 1 (Aggregated)

| California | 1500 |
|---|---|
| Oregon | 700 |
| Washington | 400 |

Run 2 (Aggregated)

| California | 1300 |
|---|---|
| Oregon | 600 |
| Washington | 250 |

*FIG. 4C*

COMBINED SORT AND AGGREGATION

CROSS-REFERENCES TO RELATED APPLICATIONS

The present application is a continuation of U.S. patent application Ser. No. 15/951,002 filed Apr. 11, 2018, entitled COMBINED SORT AND AGGREGATION, which claims the benefit and priority under 35 U.S.C. 119(e) of U.S. Provisional Application No. 62/484,779 filed Apr. 12, 2017, entitled COMBINED SORT AND AGGREGATION, the entire contents of which are incorporated herein by reference for all purposes.

BACKGROUND

In many computing applications, sorting and aggregating are fundamental operations used to manipulate and process data records. A sort operation may involve any process of arranging data records systematically in sequence or set based upon some sorting criterion or category.

An aggregation operation may involve combining values of multiple data records grouped together based on certain criteria in order to form a single value of more significant meaning or measurement. Examples of common aggregate functions include: a sum function that finds the sum of its inputs, an average function that finds the arithmetic mean of its inputs, a median function that finds the median of the inputs, a mode function that finds a mode based upon the inputs, a maximum function that finds the maximum value from among its inputs, a minimum that finds the minimum value from among its inputs, a count function that counts values of multiple data items, and others.

In conventional systems, data records are fully sorted (e.g., to group the data records based on certain criteria) before aggregation can be performed (e.g., on the sorted groups of data records). In such conventional systems, all of the data records must be loaded into memory in order to perform a full sort. However, if the number of data records is large, a large amount of memory will be needed in order to store all of the data records. If there is not enough memory to store all of the data records, then batches of sorted data records will have to be spilled to disk (e.g., written to external storage), which is orders of magnitude slower than accessing memory. This can make the sort operation more resource and time-consuming due to frequent spilling to disk, and the speed of the sort operation will heavily depend on the number of data records and the underlying computing resources available to the data processing system.

Further, simply increasing the maximum memory available for the sort operation is not an adequate solution because the overall memory for a data processing system may be fixed and shared with other processes executed by the system. Providing too much memory to the sort operation may result in other processes being starved of essential memory resources and this may also adversely impact the overall functioning of the data processing system. Dedicating a larger amount of memory to perform sorting is also not an adequate solution because it may result in inefficient underutilization of the available memory on the data processing system.

BRIEF SUMMARY

The present disclosure relates generally to techniques for enhancing the performance of an operation using enhanced memory management techniques. In certain embodiments, an innovative new technique is described for performing a combined sort and aggregation operation involving eagerly performing aggregation while sorting. The techniques described herein enable the aggregation coupled with a group-by operation to be performed using an amount of system memory that is far less than the system memory required to store all the data records being processed while minimizing the need to spill data to disk. This combined sort and aggregation operation has better performance than conventional techniques since system memory is used more efficiently. Various inventive embodiments are described herein, including methods, systems, non-transitory computer-readable storage media storing programs, code, or instructions executable by one or more processors, and the like.

In certain embodiments, a combined sort and aggregation operation is disclosed that enables the efficient sorting and aggregation of data records when the desired aggregation function is composable (such as SUM, COUNT, MIN and MAX operations).

In certain embodiments, for a collection of input data records on which the aggregation along with a group-by operation is to be performed, the collection of data records is split into smaller chunks or runs, with each chunk or run comprising a subset of the collection of data records. Each chunk or run is then subjected to eagerly performing aggregation while sorting. In some embodiments, a sorting operation is performed on the data records in each chunk or run based on a sorting key (group-by key) to produce a sorted run for the chunk or run and then an aggregate function is applied to the sorted records in the chunk or run to generate an aggregate result for each chunk or run. The aggregate results at the chunk or run level may then be aggregated by merging the chunks or runs on a pair-wise basis until a single chunk or run remains in system memory. The remaining chink or run comprises the overall result of the aggregate and group-by operation.

In certain embodiments, the input data records are broken up into chunks and the chunks sorted to generate sorted runs for the chunks. In some embodiments, a sorted run can then be combined with another sorted run to generate a combined sorted run. This is easy to do since the sorted runs have already been sorted and arranged by result keys. Two or more combined sorted runs may be combined to generate a larger combined sorted run. Multiple result records may be further combined (which) to eventually generate a final sorted result set for the entire collection of data records. Thus, after each chunk is sorted, an aggregate function is applied to each sorted chunk based on the key in order to obtain aggregate results for each sorted chunk. The aggregate results for each sorted chunk are merged and aggregated in order to obtain a final aggregate result, which would be the same result obtained if sorting and aggregate operations were performed directly on the initial collection of data records. In other words, rather than aggregating the initial collection of data, the aggregation can be intelligently broken up into multiple sub-aggregations that produce result records that can be combined at the end to yield the same aggregation result. By doing so, memory can be used more efficiently to effectively reduce the number of sorted runs generated, especially since the number of result keys is likely to be significantly smaller than the number of input data records.

In certain embodiments, various embodiments including methods, systems, non-transitory computer-readable storage media storing programs, code, or instructions executable by one or more processors, are disclosed. The methods maybe executable by a data processing system comprising one or more processors and associated memory. For example, the data processing system may receive a request to apply an aggregate function to a plurality of records and to group results by values of a particular field of the plurality of records. The data processing system may then determine a result for the request, wherein the result is determined by the data processing system using an amount of the memory that is less than an amount of memory needed for storing the plurality of records. The data processing system may then output the result as a response to the request. In certain embodiment, determining the result may involve storing, in memory, a first run of records and a second run of records, the first run of records comprising a first subset of records from the plurality of records, and the second run of records comprising a second subset of records from the plurality of records, wherein a total number of records in the first and second runs is less than the plurality of records. For the records in the first run, the data processing system may determine, by eagerly performing aggregation while sorting, a first aggregate value for those records in the first run that have a first value in the particular field and a second aggregate value for those records in the first run that have a second value in the particular field. For the records in the second run, the data processing system may determine, by eagerly performing aggregation while sorting, a third aggregate value for those records in the second run that have the first value in the particular field and a fourth aggregate value for those records in the second run that have the second value in the particular field. In some embodiments, the data processing system may further determine a fifth aggregate value based upon the first aggregate stored in the first run and the third aggregate stored in the second run, determine a sixth aggregate value based upon the second aggregate stored in the first run and the fourth aggregate value stored in the second run, and create, in memory, a first merged run and storing in the first merged run a record including the fifth aggregate value and a record including the sixth aggregate value.

In certain embodiments, the aggregate function is a composable aggregate function, such as a SUM function, a COUNT function, a MIN function, a MAX function, and the like. In certain embodiments, determining the first aggregate value and the second aggregate value by the data processing system includes sorting the records in the first run based upon values in the records of the particular field, and after the sorting, determining the first aggregate value by applying the aggregate function to the records in the first run having the first value in the particular field, and determining the second aggregate value by applying the aggregate function to the records in the first run having the second value in the particular field. In certain embodiments, determining the third aggregate value and the fourth aggregate value includes sorting the records in the second run based upon values in the records of the particular field, and after the sorting, determining the third aggregate value by applying the aggregate function to the records in the second run having the first value in the particular field, and determining the fourth aggregate value by applying the aggregate function to the records in the second run having the second value in the particular field.

In certain embodiments, determining the first aggregate value and the second aggregate value may include replacing those records in the first run that have the first value in the particular field with a record including the first aggregate value, and replacing those records in the first run that have the second value in the particular field with a record including the second aggregate value. In certain embodiments, determining the third aggregate value and the fourth aggregate value may include replacing those records in the second run that have the first value in the particular field with a record including the third aggregate value, and replacing those records in the second run that have the second value in the particular field with a record including the fourth aggregate value.

In certain embodiments, the data processing system may further read additional records from the plurality of records, and store the additional records in a third run of records in memory. In certain embodiments, for the records in the third run, the data processing system may determine, by eagerly performing aggregation while sorting, a seventh aggregate value for those records in the third run that have the first value in the particular field and an eighth aggregate value for those records in the third run that have the second value in the particular field.

In certain embodiments, the data processing system may determine a ninth aggregate value based upon the fifth aggregate value stored in the first merged run and the seventh aggregate stored in the third run, determine a tenth aggregate value based upon the sixth aggregate stored in the first merged run and the eighth aggregate value stored in the third run, and create, in memory, a second merged run and storing in the second merged run a record including the ninth aggregate value and a record including the tenth aggregate value.

In certain embodiments, the data processing system may determine that all records from the plurality of records have been processed, and determine that the third run is the only run of records in the memory. The data processing system may then output the result where outputting the result may include providing the fifth aggregate value and the sixth aggregate value as the result of the request. In certain embodiments, the number of records in the first subset of records is the same as the number of records in the second subset of records, and the number is independent of the number of records in the plurality of records.

The foregoing, together with other features and embodiments will become more apparent upon referring to the following specification, claims, and accompanying drawings.

BRIEF DESCRIPTION OF THE DRAWINGS

FIGS. 4A-4D illustrate an example of a combined sort and aggregate operation according to certain embodiments.

DETAILED DESCRIPTION

Figure 1:
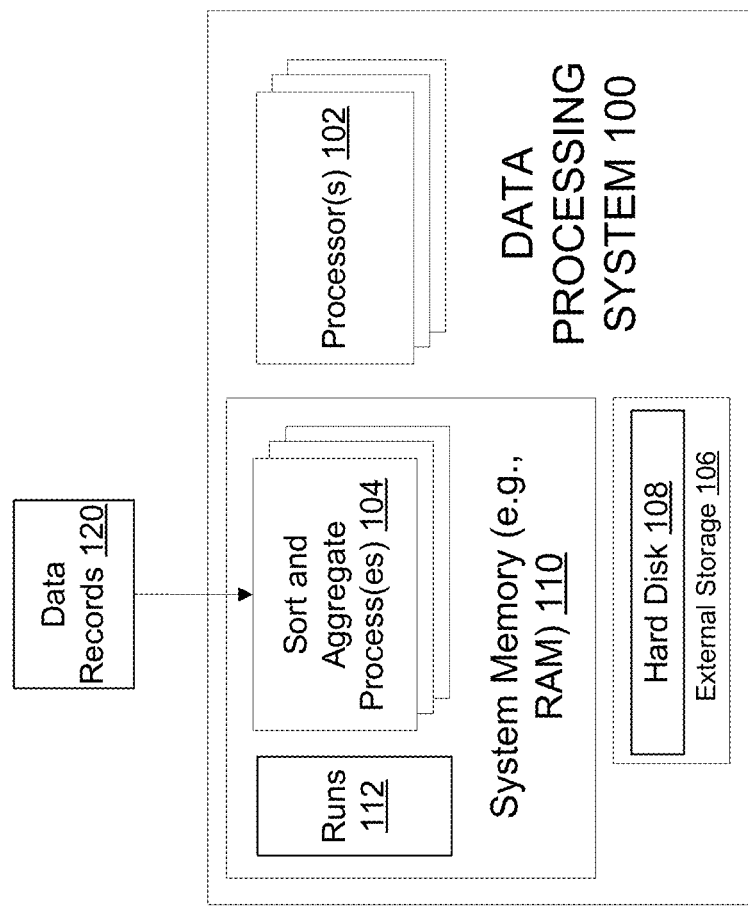
FIG. 1 is a simplified block diagram of a data processing system capable of performing a combined sort and aggregate operation according to certain embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

As an example, consider an aggregation operation that is requested to be performed on data records. However, this aggregation operation may require sorting to also be performed. For instance, if the aggregation is to be performed on data records belonging to certain categories (e.g., having a certain parameter), then the data records may have to be sorted based on category.

For instance, there may be a total of N input data records being processed. An aggregate function AF may be performed that involves a "group by key/category K" clause, where K can take one of the following values {K1, K2, . . . , Km}. Thus, data records for K1 will be aggregated, data records for K2 will be aggregated, and so forth. An example query demonstrating this scenario would be: Select Aggregate_Func(Col) from Table T where < > group by (K).

In traditional approaches for sort and aggregation, all of the data records would be transferred to memory to be fully sorted to group the data records by key/category K (e.g., by the group-by key), followed by a full scan of the sorted data to perform the aggregation. However, this approach can be inefficient when there is a large number of data records, since the cost of performing the full sort is high. In most cases, the data does not fit into the memory available on the computing machine, and sorted batches of data records have to be written out to disk (e.g., external storage) before finally merging them to reconstruct the fully sorted result. Since it is slower to write and read from disk than memory, the additional time required can be substantial.

The performance and efficiency of sort and aggregate operations being applied to the data records is generally constrained by the computing resources available for performing these operations, and further by how the sort and aggregate operations are designed to utilize those computing resources. In the traditional approach, the requirement that the data records are fully sorted (e.g., to group the data records based on certain criteria) before aggregation can be performed (e.g., on the sorted groups of data records) results in the speed at which a data processing system sorts and aggregates data records to heavily depend on the underlying computing resources available to a data processing system.

However, changing the algorithm behind the sort and aggregation can change the speed at which a data processing system sorts and aggregates data records, reducing the dependence on the underlying computing resources available to a data processing system. The present disclosure relates generally to techniques for a combined sort and aggregation operation used in the processing of data records, and more particularly to a combined sort and aggregation operation that enables the efficient sorting and aggregation of data records when the desired aggregation function is composable (such as SUM, COUNT, MIN and MAX). Various inventive embodiments are described herein, including methods, systems, non-transitory computer-readable storage media storing programs, code, or instructions executable by one or more processors, and the like.

The operation to be performed may involve applying an aggregate function "AF" to a set of data records ("N" records) and grouping the results by a group-by key identified in a group-by clause. The AF function may be applied to a particular field of the input data records. The function "AF" may be a composable function such as SUM function, COUNT function, MIN function, MAX function, and the like. The group-by key ("K") specified in the group-by clause may identify another specific field of the data records, where the specific field may take one of a set of values or categories {K1, K2, . . . Km}. In one example, the operation to be performed may be specified in a query such as:

Select AF(Field_to_be_aggregated) from Table T where < > group by (K).

The result for the above query includes aggregated results determined for each value of K.

The combined sort and aggregation operation embodiments described in this disclosure provide better performance than conventional techniques requiring a full sort of all the data records to be processed followed by application of the aggregate function. Such prior art techniques require at least an amount of system memory that is at least equal to the memory needed to store all the data records being processed. Per the embodiments described in the disclosure, the amount of memory needed to perform the aggregate and group-by operation is significantly less than the amount of memory needed to store all of the data records (e.g., the total size of all the data records). For example, in a traditional approach, for N data records being processed, all the N data records are loaded into system memory, then sorted, and then aggregated. Thus, the memory requirement would be equal to the total size (e.g., number of data records*size of data records) of the data records. By performing the sort and aggregation eagerly and incrementally as disclosed herein, the amount of system memory needed is a lot less than the total size of all the data records.

FIG. 1 is a simplified block diagram of a data processing system 100 capable of performing a combined sort and aggregate operation according to certain embodiments. Data processing system 100 depicted in FIG. 1 is merely an example and is not intended to unduly limit the scope of claimed embodiments. One of ordinary skill in the art would recognize many possible variations, alternatives, and modifications. For example, in some implementations, data processing system 100 may have more or fewer systems or components than those shown in FIG. 1, may combine two or more systems, or may have a different configuration or arrangement of systems. In some embodiments, data processing system 100 may be a server or cloud computing cluster, such as a backend server designed to process queries of a database. Data processing system 100 may include one or more computer systems or devices.

As depicted in FIG. 1, data processing system 100 may include hardware elements such as processor(s) 102, and system memory 110 (e.g., RAM). System memory 110 may provide memory resources for processors 102. System memory 110 is typically a form of volatile random access memory (RAM) (e.g., dynamic random access memory (DRAM), Synchronous DRAM (SDRAM), Double Data Rate SDRAM (DDR SDRAM)). In some embodiments, the data processing system 100 may include external storage 106, which may include non-volatile memory to store data that is to be persisted. The external storage may come in different forms such as a hard disk 108, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like.

Information related to an operating system and applications or processes executed by processors 102 may be loaded in system memory 110. For example, one or more applications and processes executed by data processing system 100 may be loaded into system memory 110. For example, as depicted in FIG. 1, multiple sort-and-aggregate processes 104 may be loaded in system memory 110 and executed concurrently by processor(s) 102 of data processing system 100. In some embodiments, system memory 110 may include runs 112 which receive and hold data records during the sort and aggregate operation.

Processor(s) 102 may be configured to execute or run instructions (e.g., code, code objects) for implementing the functions performed by data processing system 100. These functions may include database-related tasks, sorting functions, and the like. Processors 102 may include single core processors or multicore processors. Processors 102 may execute one or more virtual machines.

As depicted in FIG. 1, the sort-and-aggregate process(es) 104 may represent one or more processes executed by data processing system 100 for performing the sort and aggregate operation. Each of the sort-and-aggregate processes 104 may have input/output (I/O) access capabilities with system memory 110 and/or external storage. Multiple sort-and-aggregate processes may be executed concurrently. Each sort-and-aggregate process may receive a set of data records that the sort-and-aggregate process may be tasked with performing a sort-and-aggregate operation on. Since sort-and-aggregate processes 104 may execute in parallel, each sort-and-aggregate process may receive its own subset of records and perform the sort and aggregate operation on the records. In this manner, multiple sort and aggregate operations may be performed in parallel by multiple sort-and-aggregate processes 104. In some embodiments, data records 120 may be input to sort-and-aggregate processes 104 in order for a sort and aggregate operation to be performed. The data records 120 may come from an external source, or they may originate from the external storage 106.

Figure 2:
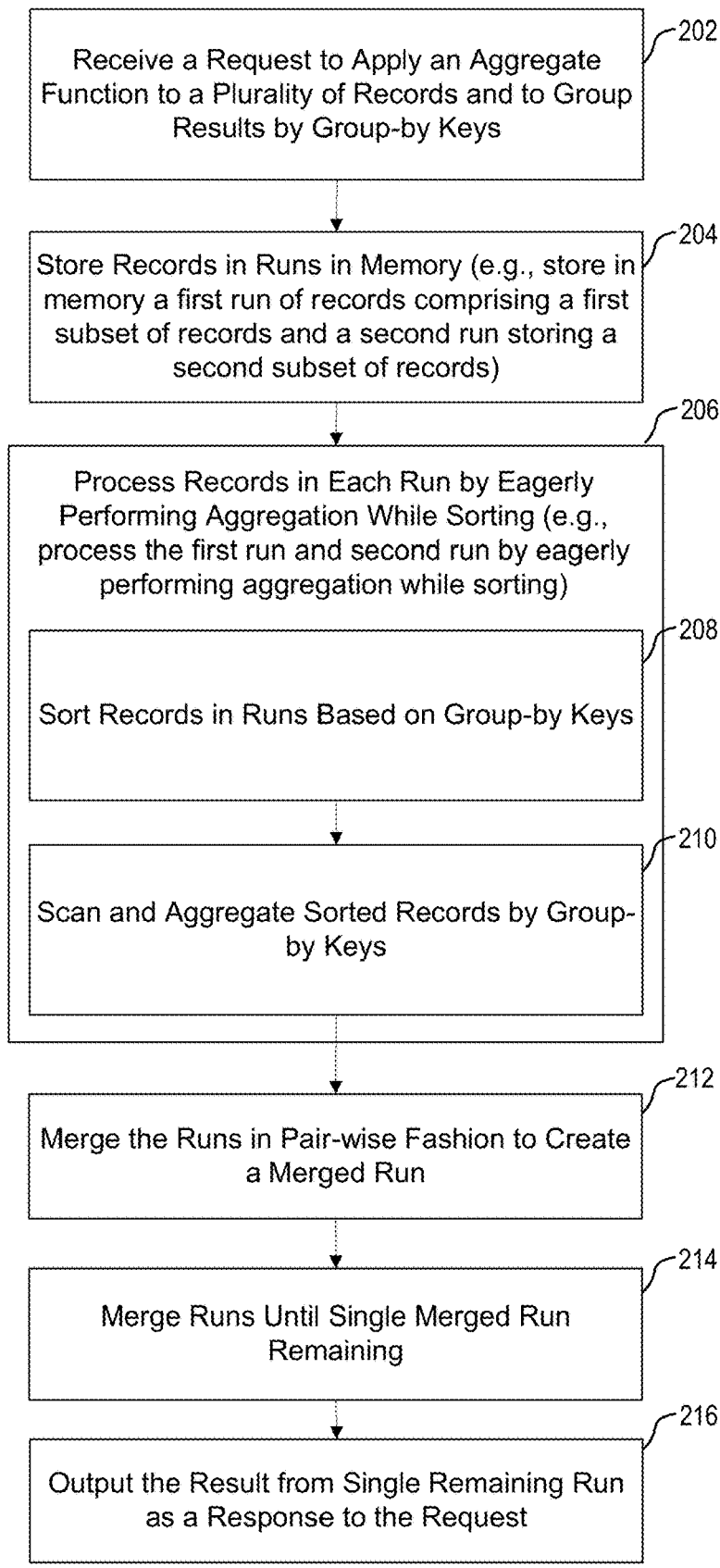
FIG. 2 is a flowchart of the combined sort and aggregate operation according to certain embodiments.

FIG. 2 is a flowchart illustrating a method of performing combined sort and aggregate operation according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by sort and aggregate process(es) 104. The processing depicted in FIG. 2 will be further explained using the example depicted in FIGS. 4A-4D.

At block 202, the processing may be initiated when a data processing system receives a request to apply an aggregate function to multiple data records and to group results by values of a group-by key in a particular field of the of the data records (e.g., key or category K). In certain embodiments, the data processing system will carry out the aggregate function and determine a final result by incrementally loading data records to be processed in memory at a time and eagerly performing aggregation while sorting to determine the final result. This is performed using an amount of memory that is less than an amount of memory needed for storing all the data records being processed. For example, the system memory needed for performing the operation is less than the memory needed for storing all the data records being processed. All the data records being processed may not even fit in the system memory at a time.

The processing may be performed by breaking and storing the data records into runs in memory. At block 204, the data processing system may divide the data records into runs in memory. For example, for sake of simplicity, a first run of records may be stored in memory comprising a first subset of records, and a second run of records may be stored in memory comprising a second subset of records. The total number of records in the first and second runs will be less than the plurality of records (e.g., there will be remaining records in the plurality of records that still need to be processed).

For example, as shown in FIG. 4A two runs of unsorted records, Run 1 and Run 2, may be stored in system memory. In this example, the group-by key is the STATE field, where the STATE field can in this example can have a value from values {California, Oregon, Washington}. As depicted in FIG. 4A, Run 1 contains 6 records and Run 2 contains 5 records.

At block 206, the records in each run are processed by eagerly performing aggregation while sorting. For example, if there are two runs, the records in each run will be processed by eagerly aggregating while sorting. For each run, the processing in 206 may include, at 208, sorting the records in the run based on the values in the records of the particular group-by key field. For example, if the group-by key is the State field, then the records will be sorted by the values that the State field takes, e.g., California, Oregon, Washington. For example, as depicted in FIG. 4B, the records in each of Runs 1 and 2 have been sorted based upon the State group-by field values, with the sort order being California, followed by Oregon, followed by Washington.

Further, as part of 206, after the sorting, at 210, the sorted data within each run is scanned and aggregated by the group-by keys. For example, as depicted in FIG. 4C, aggregation has been performed on the sorted records in each of Runs 1 and 2. The records in Run 1 have been replaced by those records showing the results of the aggregation operation performed on the data records in Run 1. As shown in FIG. 4C, the six records in Run 1 have been replaced with three records showing the results of the aggregation for California (aggregate result: 1500), Oregon (aggregate result: 700), and Washington (aggregate result: 400). Run 1 now represents the aggregate of the data records that were originally in Run 1. In this manner, once the first subset of records in the first run of records have been sorted and aggregated based on the values in the particular group-by key field, only the aggregate values are of importance and the processed records can be discarded. In a similar manner, the five records in Run 2 have been replaced with three records showing the results of the aggregation for California (aggregate result: 1300), Oregon (aggregate result: 600), and Washington (aggregate result: 250). Run 2 now represents the aggregate of the data records that were originally in Run 2.

Figure 4D:
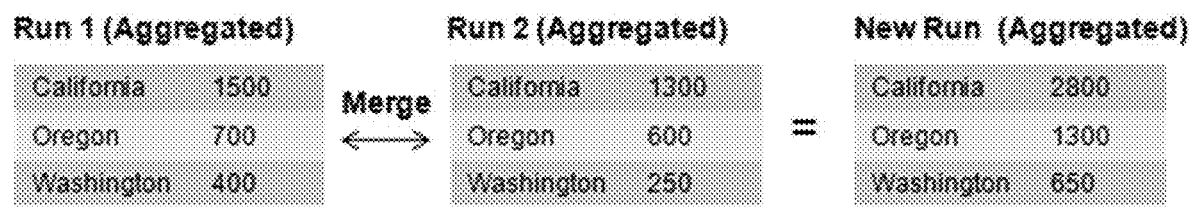

At block 212, the data processing system will merge the existing runs in memory (e.g., a first run and a second run), whose records have been sorted and aggregated, in pair-wise manner (i.e., two at a time) to create a new merged run. In doing this, the data processing system will aggregate the values in the runs being merged based upon the group-by key value. For example, as shown in FIG. 4D, aggregated Run 1 and aggregated Run 2 are merged to create an aggregated New Run, where the New Run contains records indicative of the aggregate operation being performed on aggregated Runs 1 and 2. Accordingly, as shown in FIG. 4D, the New Run contains three records: a record {California: 2800} indicative of aggregating {California:1500} in Run 1 and {California:1300} in Run 2; a record {Oregon:1300} indicative of aggregating {Oregon:700} in Run 1 and {Oregon:600} in Run 2; and a record {Washington:650} indicative of aggregating {Washington:400} in Run 1 and {Washington:250} in Run 2.

The processing depicted in blocks 204, 206 (including 208 and 210), and 212 may be repeated for new data records received until all the data records have been processed. In certain embodiments, if the entire data set does not fit into system memory or if there are runs stored to disk, a run from system memory may be written to disk before proceeding with processing of new data. The new data may then be processed according to 204, 206 (including 208 and 210), and 212.

At block 214, after determining that all the data records have been processed (i.e., there is no further data to process), all the sorted and aggregated and/or merged runs (some of which may be spilled to disk) are merged until there is a single merged run representing the final result.

At block 216, the data processing system may output the result from the single remaining run in memory as a result response to the request received in 202. The single remaining run in memory contains the aggregate result of processing all the data records according to the group-by key.

The approach depicted in FIGS. 2 and 4 and described above eagerly performs aggregation while sorting. The amount of data that is held in system memory is reduced compared to conventional approaches. Using the example above, if the total number of data records was one million ("N"), then under the conventional approaches for aggregation, the data records will be written to disk when sorting the full data (i.e., all the data records) prior to aggregation being performed. However, the new approach described herein eagerly aggregates the data and hence reduces the number of rows held in memory significantly, and there may never be a need to write any data to disk in this case. Furthermore, assuming there are only 50 distinct states in the data records (i.e., the group-by key can take 50 different values ("m")), the processing time according to certain inventive embodiments described herein would be on the order of (N log m) (i.e., 1 million*log (50)) instead of in convention approaches of (N log N) (i.e., 1 million*log (1 million).

Figure 3:
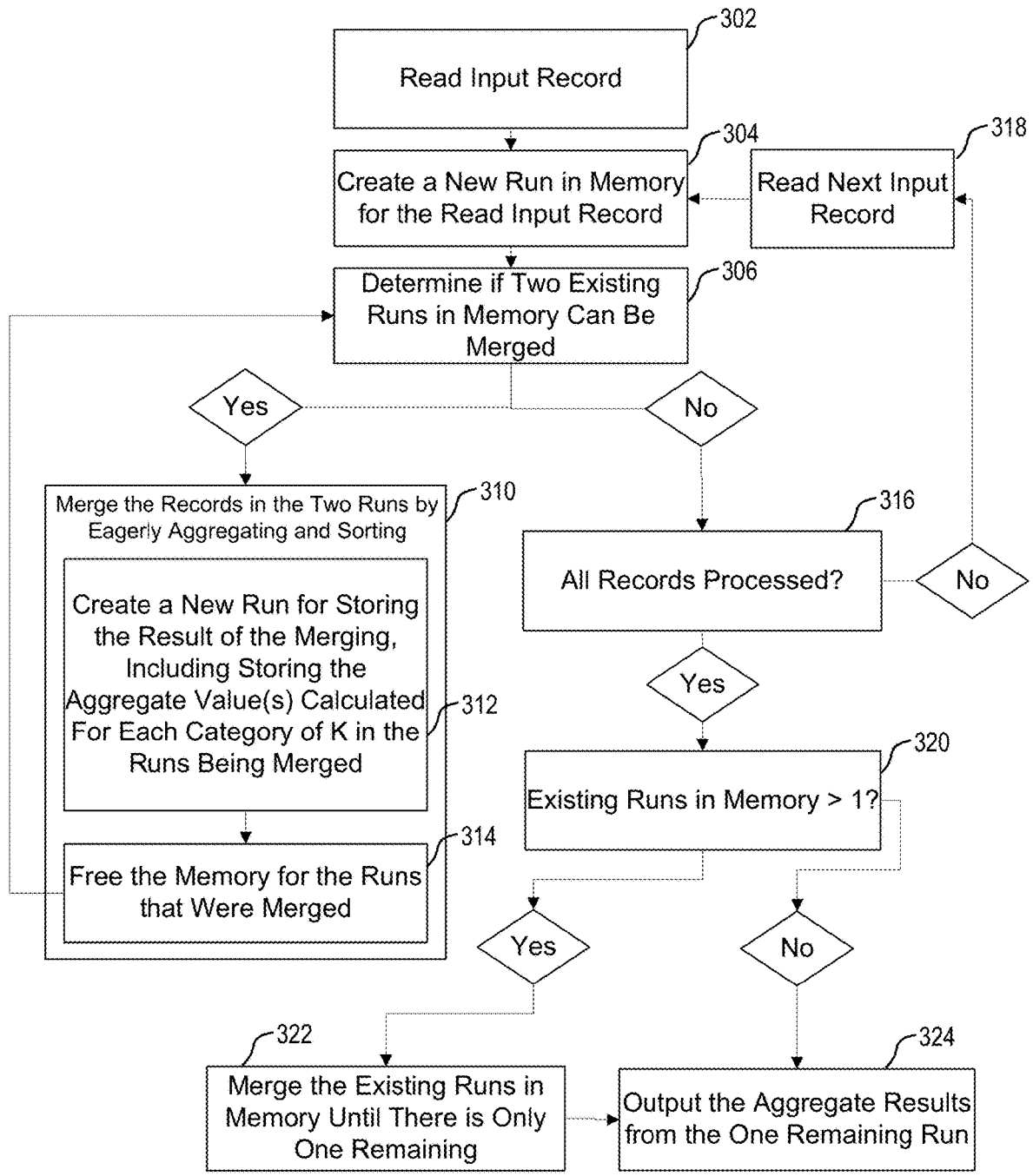
FIG. 3 is a flowchart illustrating a method of eagerly performing aggregating while sorting according to certain embodiments.

FIG. 3 is a flowchart illustrating a method of eagerly performing aggregating while sorting according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by one of the sort and aggregate processes 104.

The processing depicted in FIG. 3 assumes that data records are received as input and an aggregate function is to be performed upon the input data records for a particular field "F" according to a "group by" clause where the group-by clause is based upon a category or key "K", where key K is a value in another field of the records. For example, the input records may be received in response to a query such as:

Select AggregateFunc(F) from Table T where < > group by (K).

Examples of "AggregateFunc( ): MAX, MIN, SUM, COUNT

At block 302, the data processing system will read a single input data record or receive a data record to be processed as input. In some embodiments, the data record may be read from or received from an input run of data records.

At block 304, the data processing system will create a new run in memory for that read input data record.

At block 306, the data processing system will determine if any two existing runs in memory can be merged. In certain embodiments, two runs are eligible for merging if they both contain data records with the same count of category K. For example, a run that has data records belonging to two different categories (e.g., two different values in the particular field specified in the group-by clause) associated with the group by key will have a count of two. If there is another run in memory that also has data records belonging to two different categories, then the two runs are eligible to be merged. This will further be explained in the example described below. If this is the first time going through the flowchart, then the data processing system will have just added the first run to memory, so there will not be any merging.

If it is determined in block 306 that there exists at least two runs that can be merged, then in block 310 the two runs are merged to create a single new run by eagerly performing aggregation while sorting. As part of the processing performed in 310, the records within each run are sorted, and then at block 312, the data processing system creates a new merged run to store the results of the merge operation. As part of the processing performed in 310, an aggregate value for each category/value in field K is determined based upon the two runs being merged by eagerly aggregating while sorting. The aggregate value calculated for each value of K is then stored in the new run created for storing the results of the merging. The records are also sorted by the category or value of K in the merged run. Accordingly, in order to merge two runs, for each category K among all of the data records of the two runs, the data processing system will determine the aggregate value for all the data records for that category of K (in the two runs) by eagerly aggregating and sorting.

Then, at block 314, the data processing system will free up the memory for the two runs that were merged, thereby releasing the memory occupied by the runs. Processing then continues with 306, wherein, another determination is made if there are any two runs in memory that can be merged. In this manner, the data processing system continues to merge runs in memory until there are no two existing runs that can be merged.

Referring back to 306, if it is determined in 306 there are no two runs existing in memory that can be merged, then at block 316, the data processing system will determine if all the input data records have been processed. If it is determined in 316 that all the records have not been processed, then processing continues with block 318 where the data processing system reads the next input record, and then processing continues with 304, as described above.

If it is determined in block 316 that all the input data records have been processed, then at block 320, the data processing system checks if the number of existing runs in memory is greater than one. If it is determined in 320 that there are multiple runs existing in memory, then at block 322, the data processing system will merge all the existing runs in memory until there is only one run remaining. The merging in 322 is performed irrespective of the count of K in the runs.

Once there is only one run in memory, either after performing the processing in 322 or upon determining that there is only one run in memory in 320, at block 324 the data processing will output the final aggregate results from the one remaining run. The aggregate values in this final run represent the final aggregate values for the different categories of K for the input records that were processed.

The processing performed according to the flowchart in FIG. 3 can be depicted using the example described below and the processing described in Table A. For this example, it is assumed that the data processing system receives a request to apply an aggregate function along with a group-by clause to multiple input data records. This request may take the form of a query, such as Select SUM(Field #1) from Table T where < > group by STATE field.

Thus, in this query is an aggregate function: SUM to be performed on values of Field #1.

For this example, it is assumed that the records are received or processed in the following order:
Washington: 250;
California: 1000
Oregon: 500
California: 500
Washington: 150
Oregon: 200
Oregon: 100
California: 800
Oregon: 500
California: 500 and
Washington: 250.

It is assumed that the STATE field in the records can take the following values={California, Oregon, Washington}. The sort order is California, Oregon, Washington.

Each record may have multiple fields in addition to field containing the values to be aggregated (i.e., Field #1) and the STATE field. In certain embodiments, as part of the processing, only the two fields may be stored for each record and the other fields ignored.

TABLE A

Example for flowchart depicted in FIG. 3

| State of Runs before performing Action | | Action performed | State of Rows after performing action | |
| --- | --- | --- | --- | --- |
| — | | Read Washington: 250 and create new run for the read record. | RUN1: | Washington: 250 |
| RUN1: | Washington: 250 | No runs that can be merged, so read next record. | RUN1: | Washington: 250 |
| RUN1: | Washington: 250 | Read California: 1000 and create new run for the read record. | RUN1: RUN2: | Washington: 250 California: 1000 |
| RUN1: RUN2: | Washington: 250 California: 1000 | Since the counts for RUN1 (cnt = 1 → Washington) and RUN2 (cnt = 1 → California) are the same, merge the runs to create a new run (MR1), where the merging includes eagerly aggregating while sorting. Release RUN1 and RUN2. | MR1: | California: 1000 Washington: 250 |
| MR1: | California: 1000 Washington: 250 | Read Oregon: 500 and create new run for the read record. | MR1: RUN1: | California: 1000 Washington: 250 Oregon: 500 |
| MR1: RUN1: | California: 1000 Washington: 250 Oregon: 500 | Since the counts for MR1 (cnt = 2 → California, Washington) and RUN1 (cnt = 1 → Oregon) are NOT the same, do not merge the runs. | MR1: RUN1: | California: 1000 Washington: 250 Oregon: 500 |
| MR1: RUN1: | California: 1000 Washington: 250 Oregon: 500 | Read California: 500 and create new run for the read record. | MR1: RUN1: RUN2: | California: 1000 Washington: 250 Oregon: 500 California: 500 |

TABLE A-continued

Example for flowchart depicted in FIG. 3

| State of Runs before performing Action | Action performed | State of Rows after performing action |
|---|---|---|
| MR1: California: 1000, Washington: 250<br>RUN1: Oregon: 500<br>RUN2: California: 500 | Since the counts for RUN1 (cnt = 1 → Oregon) and RUN2 (cnt = 1 → California) are the same, merge the runs to create a new run (MR2), where the merging includes eagerly aggregating while sorting. Release RUN1 and RUN2. | MR1: California: 1000, Washington: 250<br>MR2: California: 500, Oregon: 500 |
| MR1: California: 1000, Washington: 250<br>MR2: California: 500, Oregon: 500 | Since the counts for MR1 (cnt = 2 → California, Washington) and MR2 (cnt = 2 → California, Oregon) are the same, merge the runs to create a new run (MR3), where the merging includes eagerly aggregating while sorting. Release MR1 and MR2. | MR3: California: 1500, Oregon: 500, Washington: 250 |
| MR3: California: 1500, Oregon: 500, Washington: 250 | Read Washington: 150 and create new run for the read record. | MR3: California: 1500, Oregon: 500, Washington: 250<br>RUN1: Washington: 150 |
| MR3: California: 1500, Oregon: 500, Washington: 250<br>RUN1: Washington: 150 | Since the counts for MR3 (cnt = 3 → California, Oregon, Washington) and RUN1 (cnt = 1 → Washington) are NOT the same, do not merge the runs. | MR3: California: 1500, Oregon: 500, Washington: 250<br>RUN1: Washington: 150 |
| MR3: California: 1500, Oregon: 500, Washington: 250<br>RUN1: Washington: 150 | Read Oregon: 200 and create new run for the read record. | MR3: California: 1500, Oregon: 500, Washington: 250<br>RUN1: Washington: 150<br>RUN2: Oregon: 200 |
| MR3: California: 1500, Oregon: 500, Washington: 250<br>RUN1: Washington: 150<br>RUN2: Oregon: 200 | Since the counts for RUN1 (cnt = 1 → Washington) and RUN2 (cnt = 1 → Oregon) are the same, merge the runs to create a new run (MR4), where the merging includes eagerly aggregating while sorting. Release RUN1 and RUN2. | MR3: California: 1500, Oregon: 500, Washington: 250<br>MR4: Oregon: 200, Washington: 150 |
| MR3: California: 1500, Oregon: 500, Washington: 250<br>MR4: Oregon: 200, Washington: 150 | Since the counts for MR3 (cnt = 3 → California, Oregon, Washington) and RUN1 (cnt = 1 → Washington) are NOT the same, do not merge the runs. | MR3: California: 1500, Oregon: 500, Washington: 250<br>MR4: Oregon: 200, Washington: 150 |
| MR3: California: 1500, Oregon: 500, Washington: 250<br>MR4: Oregon: 200, Washington: 150 | Read Oregon: 100 and create new run for the read record. | MR3: California: 1500, Oregon: 500, Washington: 250<br>MR4: Oregon: 200, Washington: 150<br>RUN1: Oregon: 100 |
| MR3: California: 1500, Oregon: 500, Washington: 250<br>MR4: Oregon: 200, Washington: 150<br>RUN1: Oregon: 100 | Since the counts for MR3 (cnt = 3 → California, Oregon, Washington), MR4 (cnt = 2 → Oregon, Washington) and RUN1 (cnt = 1 → Oregon) are NOT the same, do not merge the runs. | MR3: California: 1500, Oregon: 500, Washington: 250<br>MR4: Oregon: 200, Washington: 150<br>RUN1: Oregon: 100 |
| MR3: California: 1500, Oregon: 500, Washington: 250<br>MR4: Oregon: 200, Washington: 150<br>RUN1: Oregon: 100 | Read California: 800 and create new run for the read record. | MR3: California: 1500, Oregon: 500, Washington: 250<br>MR4: Oregon: 200, Washington: 150<br>RUN1: Oregon: 100<br>RUN2: California: 800 |
| MR3: California: 1500, Oregon: 500, Washington: 250<br>MR4: Oregon: 200, Washington: 150<br>RUN1: Oregon: 100 | Since the counts for RUN1 (cnt = 1 → Oregon) and RUN2 (cnt = 1 → California) are the same, merge the runs to create a new run (MR5), where the merging includes | MR3: California: 1500, Oregon: 500, Washington: 250<br>MR4: Oregon: 200, Washington: 150<br>MR5: California: 800 |

TABLE A-continued

Example for flowchart depicted in FIG. 3

| State of Runs before performing Action | | Action performed | State of Rows after performing action | |
|---|---|---|---|---|
| RUN2: | California: 800 | eagerly aggregating while sorting. Release RUN1 and RUN2. | | Oregon: 100 |
| MR3: | California: 1500 Oregon: 500 Washington: 250 | Since the counts for MR4 (cnt = 2 → Oregon, Washington) and MR5 (cnt = 2 → California, Oregon) are the same, merge the runs to create a new run (MR6), where the merging includes eagerly aggregating while sorting. Release MR4 and MR5. | MR3: | California: 1500 Oregon: 500 Washington: 250 |
| MR4: | Oregon: 200 Washington: 150 | | MR6: | California: 800 Oregon: 300 Washington: 150 |
| MR5: | California: 800 Oregon: 100 | | | |
| MR3: | California: 1500 Oregon: 500 Washington: 250 | Since the counts for MR3 (cnt = 3 → California, Oregon, Washington) and MR6 (cnt = 3 → California, Oregon, Washington) are the same, merge the runs to create a new run (MR7), where the merging includes eagerly aggregating while sorting. Release MR3 and MR6. | MR7: | California: 2300 Oregon: 800 Washington: 400 |
| MR6: | California: 800 Oregon: 300 Washington: 150 | | | |
| MR7: | California: 2300 Oregon: 800 Washington: 400 | Read Oregon: 500 and create new run for the read record. | MR7: | California: 2300 Oregon: 800 Washington: 400 |
| | | | RUN1: | Oregon: 500 |
| MR7: | California: 2300 Oregon: 800 Washington: 400 | Since the counts for MR7 (cnt = 3 → California, Oregon, Washington) and RUN1 (cnt = 1 → Oregon) are NOT the same, do not merge the runs. | MR7: | California: 2300 Oregon: 800 Washington: 400 |
| RUN1: | Oregon: 500 | | RUN1: | Oregon: 500 |
| MR7: | California: 2300 Oregon: 800 Washington: 400 | Read California: 500 and create new run for the read record. | MR7: | California: 2300 Oregon: 800 Washington: 400 |
| RUN1: | Oregon: 500 | | RUN1: | Oregon: 500 |
| | | | RUN2: | California: 500 |
| MR7: | California: 2300 Oregon: 800 Washington: 400 | Since the counts for RUN1 (cnt = 1 → Oregon) and RUN2 (cnt = 1 → California) are the same, merge the runs to create a new run (MR8), where the merging includes eagerly aggregating while sorting. Release RUN1 and RUN2. | MR7: | California: 2300 Oregon: 800 Washington: 400 |
| RUN1: | Oregon: 500 | | MR8: | California: 500 Oregon: 500 |
| RUN2: | California: 500 | | | |
| MR7: | California: 2300 Oregon: 800 Washington: 400 | Since the counts for MR7 (cnt = 3 → California, Oregon, Washington) and MR8 (cnt = 2 → California, Oregon) are NOT the same, do not merge the runs. | MR7: | California: 2300 Oregon: 800 Washington: 400 |
| MR8: | California: 500 Oregon: 500 | | MR8: | California: 500 Oregon: 500 |
| MR7: | California: 2300 Oregon: 800 Washington: 400 | Read Washington: 250 and create new run for the read record. | MR7: | California: 2300 Oregon: 800 Washington: 400 |
| MR8: | California: 500 Oregon: 500 | | MR8: | California: 500 Oregon: 500 |
| | | | RUN1: | Washington: 250 |
| MR7: | California: 2300 Oregon: 800 Washington: 400 | Since the counts for MR7 (cnt = 3 → California, Oregon, Washington), MR8 (cnt = 2 → California, Oregon) and RUN1 (cnt = 1 → Washington) are NOT the same, do not merge the runs. All records processed (i.e., no more records to read. | MR7: | California: 2300 Oregon: 800 Washington: 400 |
| MR8: | California: 500 Oregon: 500 | | MR8: | California: 500 Oregon: 500 |
| RUN1: | Washington: 250 | | RUN1: | Washington: 250 |
| MR7: | California: 2300 Oregon: 800 Washington: 400 | Start merging existing runs in memory until there is only one remaining run. Merge MR8 and RUN1, to create a new run (MR9), where the | MR7: | California: 2300 Oregon: 800 Washington: 400 |
| MR8: | California: 500 Oregon: 500 | | MR9: | California: 500 Oregon: 500 |

TABLE A-continued

Example for flowchart depicted in FIG. 3

| State of Runs before performing Action | | Action performed | State of Rows after performing action | |
|---|---|---|---|---|
| RUN1: | Washington: 250 | merging includes eagerly aggregating while sorting. Release MR8 and RUN1. | | Washington: 250 |
| MR7: | California: 2300 Oregon: 800 Washington: 400 | Merge MR7 and MR9, to create a new run (MR10), where the merging includes eagerly aggregating while sorting. Release MR7 and MR9. | MR10: | California: 2800 Oregon: 1300 Washington: 650 |
| MR9: | California: 500 Oregon: 500 Washington: 250 | | | |
| MR10: | California: 2800 Oregon: 1300 Washington: 650 | Since MR10 is the last remaining run and no more records to process, output the aggregate values from MR10 (California: 2800; Oregon: 1300; Washington: 650) as the result of the query. | MR10: | California: 2800 Oregon: 1300 Washington: 650 |

At the beginning, the data processing system will not have any runs in memory. The data processing system will read the set of records, record-by-record. For instance, the data processing system will first read (e.g., at block 302) the record of Washington:250 and create a new run (e.g., RUN1) for the read record (e.g., at block 304). At this point RUN1 will contain Washington:250.

The data processing system may check to see if any runs can be merged (e.g., at block 306). Since there is only one run in memory, no runs can be merged (e.g., go to block 316). The data processing system may determine that not all the records have been processed, which causes the data processing system to go on to read the next record (e.g., block 318), which is California:1000. The data processing system will create a new run (e.g., RUN2) for this record, and RUN2 will contain California:1000 (e.g., block 304). This will result in two runs in memory, RUN1 and RUN2.

At this point, the data processing system will check to see if two existing runs in memory can be merged. Since the memory only contains RUN1 and RUN2, the data processing system will check to see if the counts for RUN1 and RUN2 are the same (e.g., block 306). RUN1 only contains records of one category (e.g., Washington), so the count is one. Similarly, RUN2 only contains records of one category (e.g., California), so the count is also one. Since the runs have the same count, they can be merged. The data processing system merges the runs (e.g., block 310) to create a new merged run (e.g., MR1). This merging includes eagerly aggregating while sorting, and results in MR1 (e.g., block 312) containing California:1000 and Washington:250. The memory for RUN1 and RUN2 is released since it is no longer needed (e.g., block 314).

At this point, the data processing system will check to see if there are any runs that can be merged (e.g., go back to block 306). There is only one run (MR1) in memory, so the data processing system will check to see if all records are processed (e.g., block 316). Since there are still records left, the system will read the next record, Oregon:500, (e.g., block 318) and create a new run (e.g., RUN1) for the read record (e.g., block 304). This results in the memory having two runs, MR1 and RUN1 containing Oregon:500.

At this point, the data processing system will check to see if there are runs that can be merged (e.g., block 306). To do this, the data processing system will compare the counts for MR1 and RUN1 to see if they are the same. MR1 contains records of two categories (e.g., California and Washington), so the count is two. RUN1 only contains records of one category (e.g., Oregon), so the count is also one. Since the runs have different counts, they cannot be merged. Thus, the data processing system will go on to check if all records have been processed (e.g., block 316), for which the answer is no.

This results in the data processing system going on to read the next record, California:500, (e.g., block 318) and creating a new run (e.g., RUN2) for the read record (e.g., block 304). At this point, the memory contains three runs: MR1, RUN1, and RUN2 now containing California:500.

Once again, the data processing system will check to see if there are any runs that can be merged (e.g., block 306). RUN2 has a count of one since it contains records of one category (e.g., California), which allows it to be merged with RUN1 which also has a count of one. These two runs are merged to create a new merged run (e.g., MR2), and the merging process includes eagerly aggregating while sorting (e.g., block 310 and block 312). The memory for RUN1 and RUN2 is released (e.g., block 314), and the memory now only includes MR1 and MR2. MR1 contains the records California:1000 and Washington:250, and MR2 contains the records California:500 and Oregon:500.

The data processing system will then check to see if there are any runs that can be merged by comparing the counts of existing runs (e.g., by going back to block 306). MR1 (California, Washington) and MR2 (California, Oregon) both have a run count of two, so they can be merged to create a new merged run (e.g., MR3). This merging (e.g., block 310 and block 312) includes eagerly aggregating while sorting. MR3 will contain the records California:1500, Oregon:500, and Washington:250. Notice that the value for the record for California from MR1 and the value for the record for California from MR2 have been combined into a single record with an aggregate value (e.g., 1000+500=1500). The memory for MR1 and MR2 is then released (e.g., block 314).

At this point, the data processing system will check to see if there are any runs that can be merged (e.g., block 306). The memory only contains MR3, so the data processing system will check to see if all the records have been processed (e.g., block 316) before reading the next record, Washington:150, (e.g., block 318) and create a new run (e.g., RUN1) for the record (e.g., block 304). Since the count of RUN1 is one and MR3 is three, they cannot be merged (e.g., block 306). Thus, the data processing system will determine that all the records have not been processed before reading the next data record, Oregon:200, (e.g., block 318) and creating a new run (e.g., RUN2) for that record (e.g., block 304). At this point, the memory will contain MR3, RUN1, and RUN2.

The data processing system will again check to see if any runs can be merged (e.g., block 306). Since the counts for RUN1 (Washington) and RUN2 (Oregon) are both one, the data processing system will merge the runs (e.g., block 310) to create a new run (MR4), (e.g., block 312) where the merging includes eagerly aggregating while sorting. The memory for RUN1 and RUN2 will then be released (e.g., block 314). At this point, the memory will contain MR3: {California:1500; Oregon:500; Washington:250} and MR4: {Oregon:200; Washington:150}.

The data processing system will check to see if any runs can be merged (e.g., block 306). Since the count for MR3 is three (California, Oregon, Washington) and MR4 is two (Oregon, Washington) and are not the same, the runs cannot be merged. Thus, the data processing system will determine that there are more records to process (e.g., block 316) and read the next record, Oregon:100, (e.g., block 318) and create a new run (RUN1) for the read record (e.g., block 304).

The data processing system will check to see if any runs can be merged (e.g., block 306). Since the counts for MR3, MR4, and RUN1 (Oregon) are not the same, none of the runs can be merged. The data processing system will determine if there are more records to process (e.g., block 316) and read the next record, California:800, (e.g., block 318) and create a new run for the read record (e.g., block 304). At this point, the memory contains four runs: MR3: {California:1500; Oregon:500; Washington:250}, MR4: {Oregon:200; Washington:150}, RUN1: {Oregon:100}, and RUN2: {California:800}.

The data processing system will check to see if any runs can be merged (e.g., block 306). Since the counts for RUN1 (Oregon) and RUN2 (California) are the same, the data processing system will merge the runs (e.g., block 310) to create a new merged run (e.g., MR5). The merging includes eagerly aggregating while sorting. The memory for RUN1 and RUN2 will be released (e.g., block 314). At this point, the memory will contain MR3: {California:1500; Oregon: 500; Washington:250}, MR4: {Oregon:200; Washington: 150} and MR5: {California:800; Oregon:100}.

The data processing system will then check to see if any runs can be merged (e.g., block 306). Since the count for MR4 is two (Oregon, Washington) and MR5 is two (California, Oregon) and are the same, MR4 and MR5 can be merged (e.g., block 310 and block 312) to create a new merged run (MR6). The merging process includes eagerly aggregating while sorting. The memory for MR4 and MR5 will be released (e.g., block 314). At this point, the memory will include MR3 and MR6: {California:800; Oregon:300; Washington:150}.

The data processing system will check to see if any runs can be merged (e.g., block 306). Since the counts for MR3 is three (California, Oregon, Washington) and MR6 is three (California, Oregon, Washington) and are the same, the data processing system will merge the runs (e.g., block 310 and block 312) to create a new run (MR7), where the merging includes eagerly aggregating while sorting. The data processing system will release the memory for MR3 and MR6 (e.g., block 314). MR7: {California:2300; Oregon:800; Washington:400}.

The data processing system will again check to see if any runs can be merged (e.g., block 306). Since there is only one run in the memory, the data processing system will determine there are still records to process (e.g., block 316) and read the next record, Oregon:500 (e.g., block 318) and create new run for the read record (e.g., block 304). At this point the memory will contain MR7 and RUN1{Oregon:500}.

The data processing system will check to see if any runs can be merged (e.g., block 306). Since the counts for MR7 is three (California, Oregon, Washington) and RUN1 is one (Oregon), the data processing system does not merge the runs. Instead, the data processing system will determine there are still records to process (e.g., block 316) and read the next record, California:500, (e.g., block 318) and create new run for the read record (e.g., block 304). At this point the memory will contain MR7, RUN1, and RUN2{California:500}.

The data processing system will then check to see if any runs can be merged (e.g., block 306). Since the counts for RUN1 (Oregon) and RUN2 (California) are the same, the data processing system can merge the runs (e.g., block 310 and block 312) to create a new run (MR8:{California:500; Oregon:500}), where the merging includes eagerly aggregating while sorting. The memory for RUN1 and RUN2 will be released (e.g., block 314).

The data processing system will check to see if any runs can be merged (e.g., block 306). Since the counts for MR7 (California, Oregon, Washington) and MR8 (California, Oregon) are not the same, the system does not merge the runs. Instead, the data processing system will determine there are still records to process (e.g., block 316) and read the next record, Washington:250, (e.g., block 318) and create new run for the read record (e.g., block 304). The memory at this point will hold MR7: {California:2300; Oregon:800; Washington:400} and MR8:{California:500; Oregon:500}, and RUN1: {Washington:250}.

The data processing system will check to see if any runs can be merged (e.g., block 306). Since the counts for MR7 is three (California, Oregon, Washington), MR8 is two (California, Oregon) and RUN1 is one (Washington), none of the runs can be merged. At this point, the data processing system may determine that all the records have been processed (e.g., block 316). In this case, the data processing system checks to see if the number of runs in memory is greater than one (e.g., block 320). If this is the case, as in this example, the data processing system starts merging existing runs in memory until there is only one remaining run (e.g., block 322). In some embodiments, the data processing system may prioritize the pair-wise merging of runs of similar size at this stage. Since the memory contains MR7: {California:2300; Oregon:800; Washington:400} and MR8: {California:500; Oregon:500}, and RUN1: {Washington: 250}, the data processing system will merge MR8 and RUN1, to create a new run (MR9:{California:500; Oregon: 500; Washington:250}), where the merging includes eagerly aggregating while sorting. The memory for MR8 and RUN1 is released. Then the data processing system merges MR7 and MR9, to create a new run (MR10:{California:2800; Oregon:1300; Washington:650}), where the merging includes eagerly aggregating while sorting. The data processing system releases the memory for MR7 and MR9.

At this point, there is only one remaining run, MR10, in memory. With no more records to process, the data processing system will read MR10 in order to output the aggregate values (e.g., block 324), which are now {California:2800; Oregon:1300; Washington:650}, as the result of the query.

Figure 5:
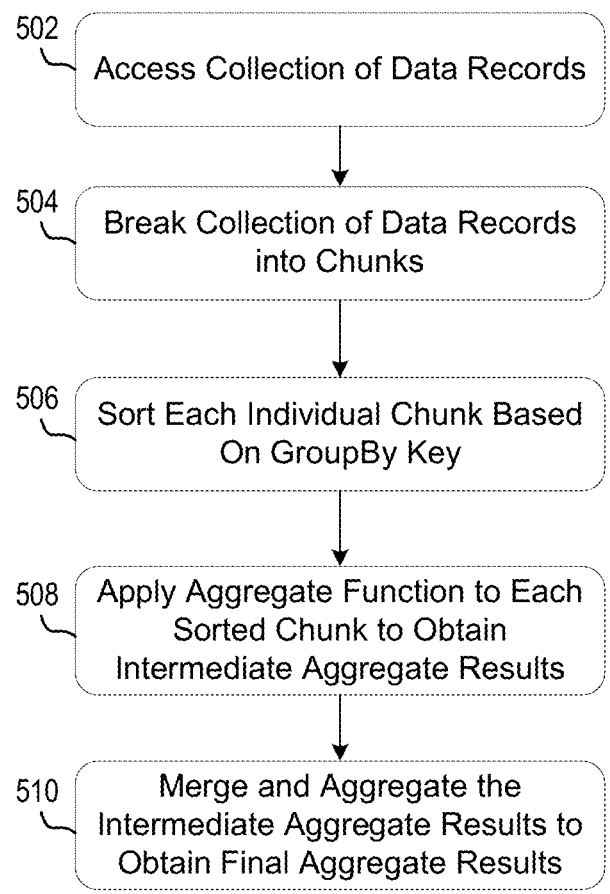
FIG. 5 illustrates a flow chart for performing combined sort and aggregate operation according to certain embodiments.

FIG. 5 illustrates a flow chart for the combined sort and aggregate operation according to some embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

In some embodiments, at block 502, the data processing system may access or receive a collection of data records. In some of such embodiments, the collection of data records may be stored in one or more databases. In certain embodiments, the data records in the collection may include key/value pairs. For example, the collection may be a collection of key/value pairs, with an example of one of the key/value pairs being "California" as the key and "500" as the corresponding value. A single data record may have more than one key and/or more than one value.

In certain embodiments, at block 504, the data processing system may split the collection of data records into chunks or runs. In some embodiments, the data records may be read incrementally, record-by-record, such that each data record is initially stored by itself in its own chunk or run.

In certain embodiments, at blocks 506, 508, and 510, the data processing system may merge two chunks or runs together by sorting the data records within the two chunks based on a particular value or key, such as a group-by key. The specific key used in the sorting operation may be provided by a user of the system (e.g., in the query), or it may be determined automatically by the system based on the needs/desires of the user. Aggregation is eagerly performed while the data records are sorted, and a merged run is produced that contains the aggregate values of the records.

At block 510, runs may be merged together to merge intermediate aggregate values until a single run is remaining, which will contain final aggregate values associated with the processing of all the data records. There may be various methods and techniques for merging runs (some of which will contain intermediate aggregate result records). For example, in certain embodiments, the runs may be greedily merged in a pair-wise fashion. In other words, as runs are obtained and it is determined that they can be merged, they may be merged into a singular merged run in real-time (this can be analogized to individually checking each of a plurality of bank accounts and adding that balance value to an ongoing-tally of the total balance across all bank accounts).

For instance, the aggregate function could be a SUM function that, when applied, provides a sum of all the values associated with the "California" data records and also a sum of all the values associated with the "Oregon" data records. Accordingly, the final resulting run will contain a record that sums up all the values associated with the "California" data records in all the data records, and will also contain a record that sums up all the values associated with the "Oregon" data records.

It should be noted that different aggregate functions used may produce a single value in different ways. For example, the SUM aggregation takes the sum of the column values corresponding to the various categories or keys. The COUNT aggregation counts every occurrence of a record of a certain category or key, and can be thought of conceptually as adding together a "1" for each occurrence (i.e., maybe implemented by a SUM function that adds a "1" for each occurrence). The MIN aggregation takes the minimum of the column values corresponding to the various keys, while the MAX aggregation takes the maximum of the column values corresponding to the various keys. An example diagram is provided below:

|  | Initial Value(s) | Function |
| --- | --- | --- |
| Sum | Column Value | Sum |
| Count | 1 (indicates occurrence) | Sum |
| Min | Column Value | Min |
| Max | Column Value | Max |

Figure 6:
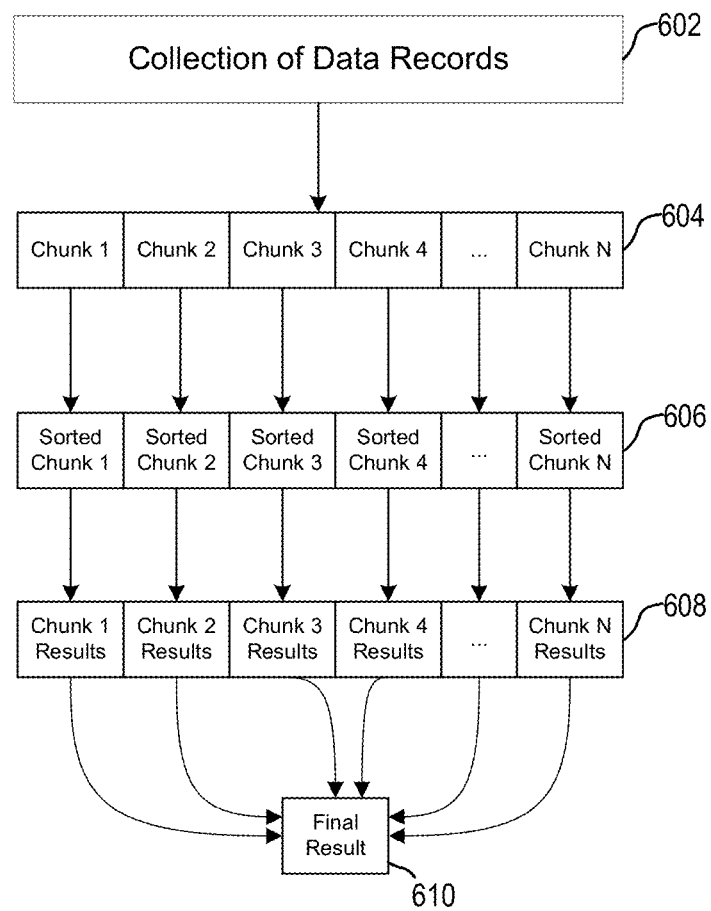
FIG. 6 illustrates another flow chart for performing a combined sort and aggregate operation according to certain embodiments.

FIG. 6 illustrates another flow chart for performing a combined sort and aggregate operation according to some embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel.

A collection of data records 602 may be broken up into chunks 604 or runs. Thus, chunks 604 may represent non-overlapping subsets of the collection 602 so that data records in a particular chunk are not duplicated in another chunk. This may involve reading the data records incrementally, record-by-record, such that each record initially is stored in a chunk. The system may sort chunks 604 to obtain sorted chunks 606, where the sorting is based upon the values of the group-by key of the records in each chunk. At the same time, the system may eagerly perform aggregation while sorting in order to obtain the intermediate aggregate result records 608 obtained from sorting and aggregating the chunks 604. All of the intermediate aggregate results 608 may be combined into the final result 610 based on the aggregation function.

The teachings described herein can be used in various different settings and contexts. In one such example, the teachings may be used by an analytics server that is configured to receive a large amount of data records and has to perform various types of analyses on the records, where the analyses involve applying an aggregate function along with a "group by" clause to the data records. For example, Oracle Corporation® provides an Analytics Server that acts as a query and analysis engine for multiple Oracle Business Intelligence (BI) offerings, such as Oracle Data Visualization Desktop. Oracle Data Visualization Desktop's user interface is a tool called Visual Analyzer, which allows business users to visualize and explore their data using rich visualizations. The Visual Analyzer analyses data and provides business users with various visualizations (e.g., graphs, pie charts, etc.) that allow business users to better interpret and comprehend the mountains of data that has been collected in order to draw inferences and arrive at conclusions. Once the Visual Analyzer is provided user inputs laying out the parameters of the analysis to be performed, the Visual Analyzer generates and issues SQL statements to Oracle BI Analytics Server. The Server processes these SQL statements and returns the relevant data, which is then presented by Visual Analyzer to the business users using various forms of visualization, e.g. pie charts, line graphs, etc. The execution of the SQL statements by the Server can generate a large amount of the data records that have to be processed by applying an aggregate function and a "group by" clause to the data records before the server can return the relevant data to the Visual Analyzer, depending on the needs of the business user. The teachings describe in the disclosure may be used by the Server to apply such an aggregate function and a "group by" clause in an efficient manner.

The combined sort and aggregation operation embodiments described in this disclosure provide better performance than conventional techniques requiring a full sort of all the data records to be processed followed by application of the aggregate function. Such prior art techniques requires at least an amount of system memory that is at least equal to the memory needed to store all the data records being processed. Per the embodiments described in the disclosure, the amount of memory needed to perform the aggregate and group-by operation is significantly less than the amount of memory needed to store all of the data records (e.g., the total size of all the data records). For example, in a traditional approach, for N data records being processed, all the N data records are loaded into system memory, then sorted, and then aggregated. Thus, the memory requirement would be equal to the total size (e.g., number of data records*size of data records) of the data records. By performing the sort and aggregation eagerly and incrementally as disclosed herein, the amount of system memory needed is a lot less than the total size of all the data records.

Another advantage of this technique is improved efficiency and less time needed to perform the aggregate and group-by operation. In traditional approaches, the time needed to perform the aggregation operation would be on the order (N log N) (e.g., dependent on the logarithm of the total number of data records). However, by performing the sort and aggregation operations according to certain embodiments disclosed herein, the time needed to perform the aggregation is of the order (N log m), where m is the total number of different categories of K specified in the group-by clause. Since m is typically a lot smaller than N, this translates to significant savings in processing time over conventional techniques.

Figure 7:
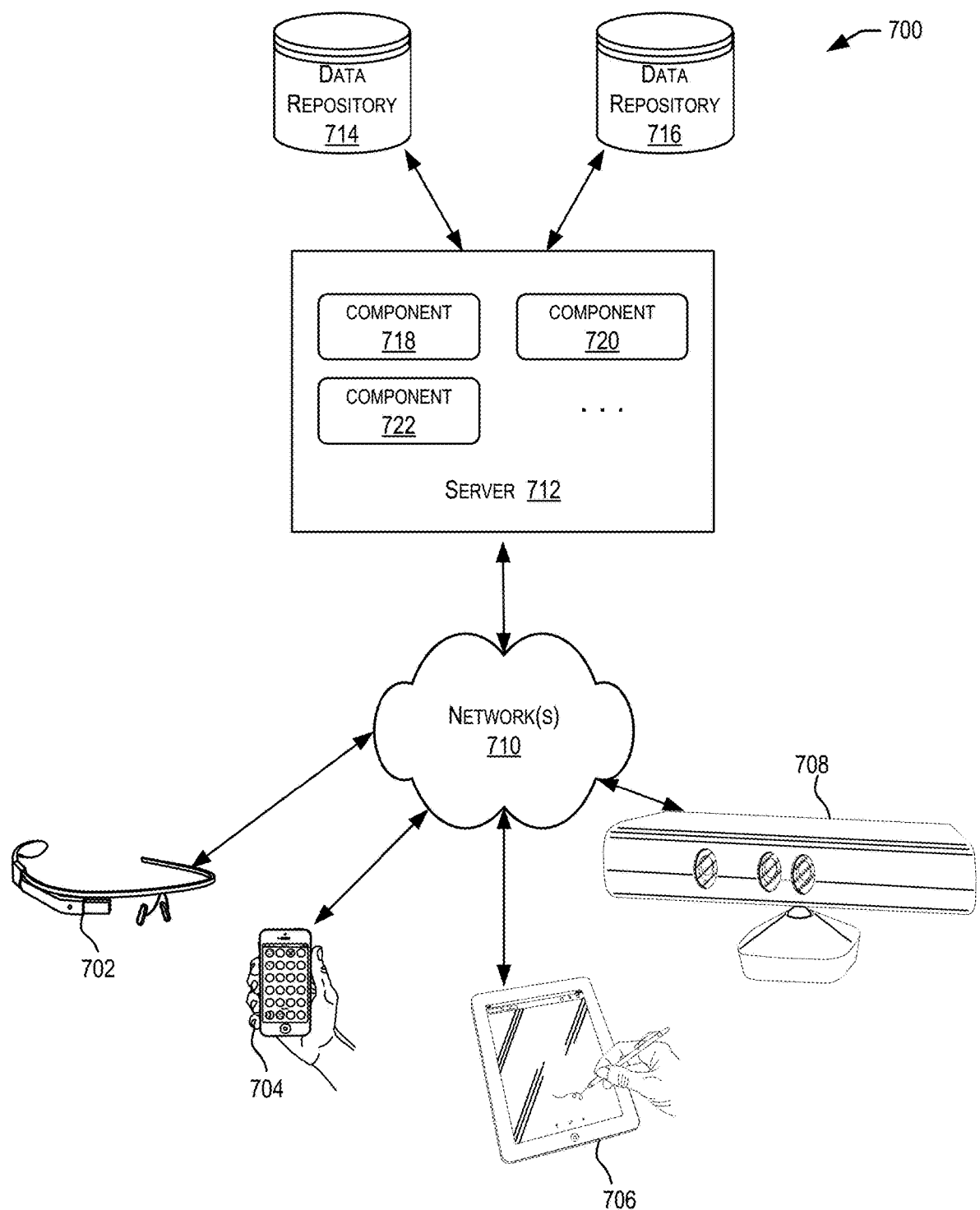
FIG. 7 depicts a simplified diagram of a distributed system for implementing certain embodiments.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable the memory management techniques described herein.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
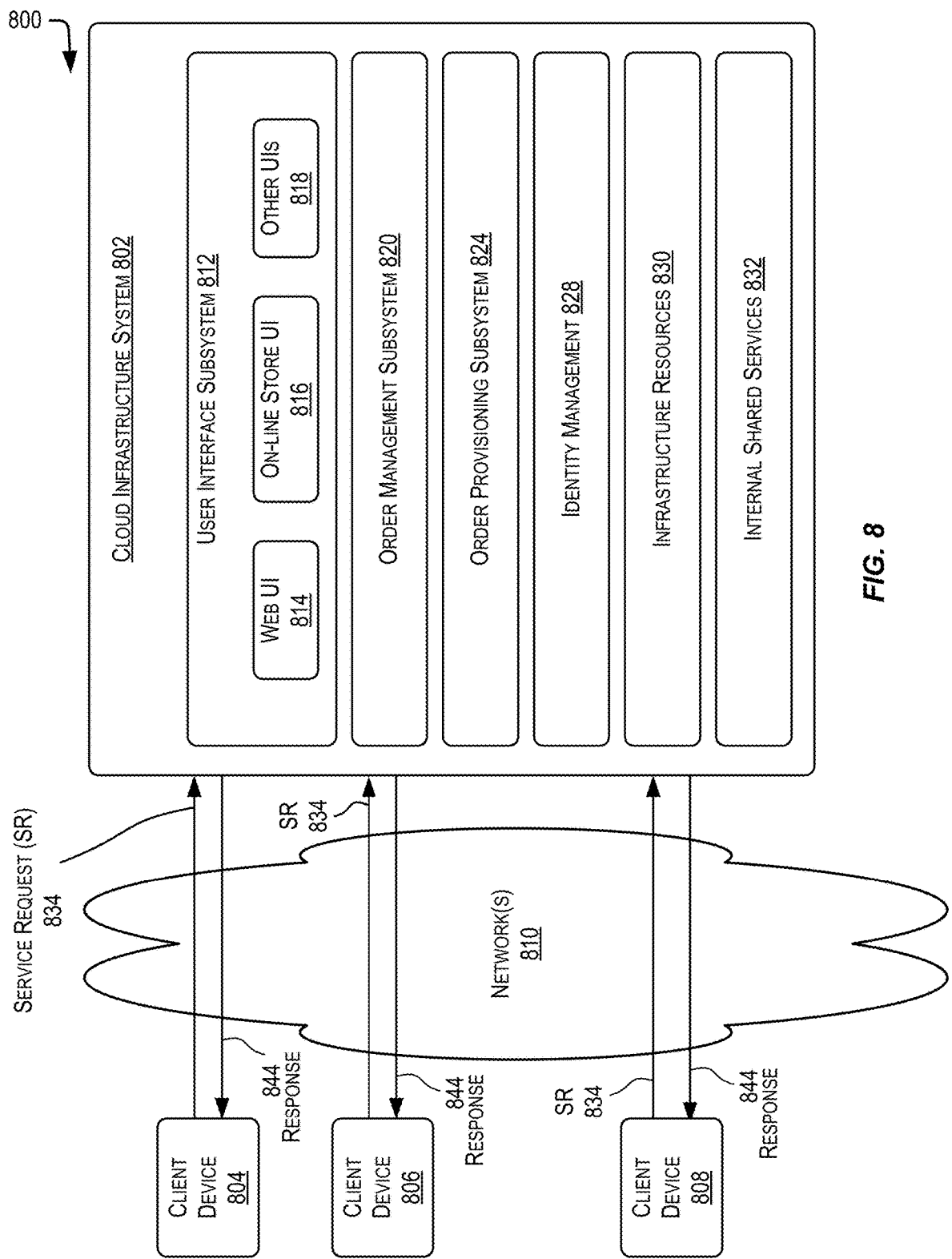
FIG. 8 is a simplified block diagram of a cloud-based system environment in which various services may be offered as cloud services, in accordance with certain embodiments.

In certain embodiments, the memory management-related functionalities described in this disclosure may be offered as services via a cloud environment. FIG. 8 is a simplified block diagram of a cloud-based system environment in which memory management-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802.

In some embodiments, the processing performed by cloud infrastructure system 802 for providing services may involve big data analysis. This analysis may involve using, analyzing, and manipulating and sorting large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
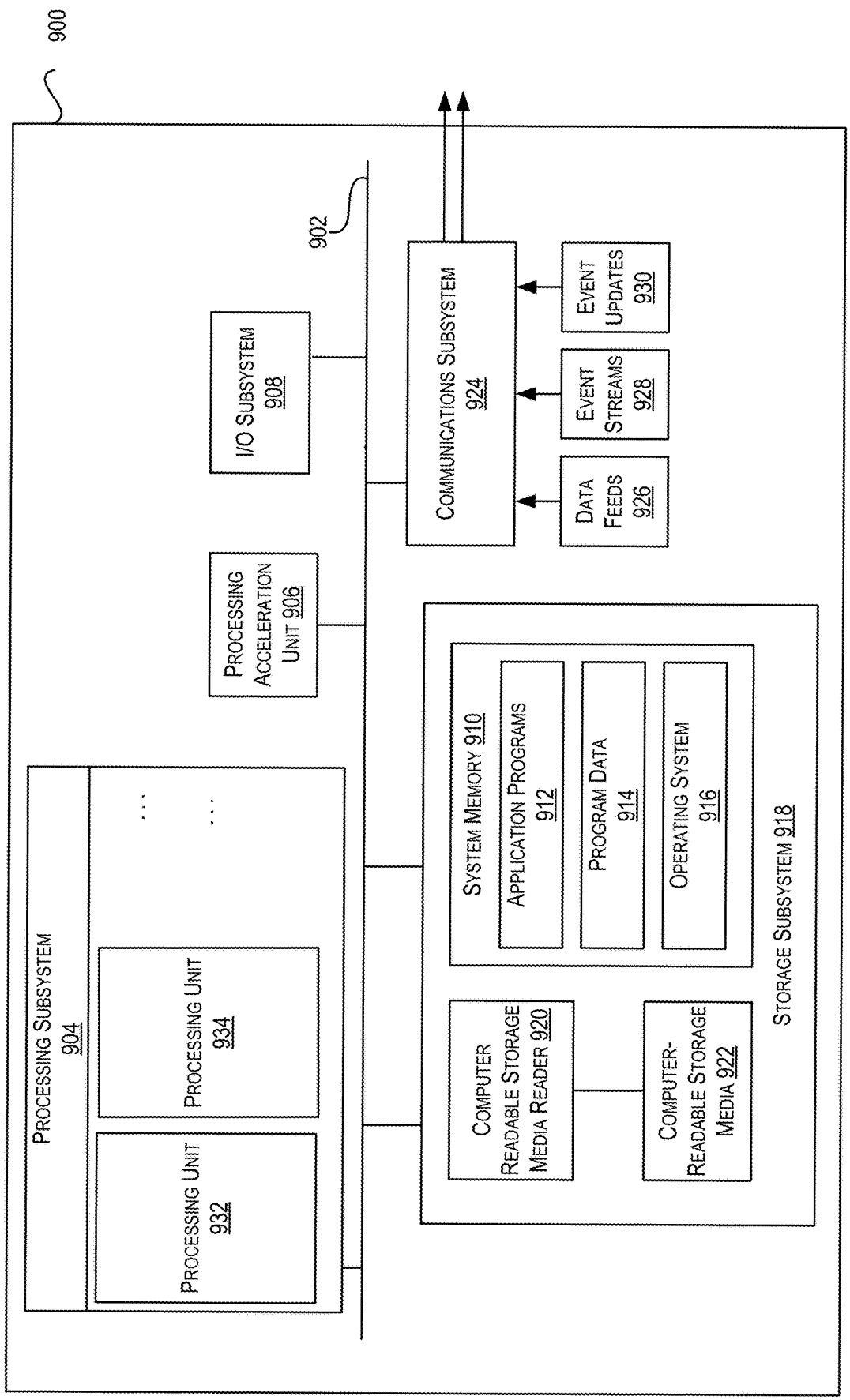
FIG. 9 illustrates an exemplary computer system that maybe used to implement certain embodiments.

FIG. 9 illustrates an exemplary computer system 900 that may be used to implement certain embodiments. For example, in some embodiments, computer system 900 may be used to implement data processing system 100 depicted in FIG. 1. Data processing system 100 may comprise one or more computer systems 900. Computer system 900 may also be used to perform the various processing described in this disclosure. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. A method comprising:
receiving, by a data processing system comprising one or more processors and associated memory, a request to apply an aggregate function upon input data records for a particular field according to a group-by clause, wherein the group-by clause is based upon a category or key, and wherein the category or key is a value in another field of the input data records;

reading, by the data processing system, a record of the input data records;

creating, by the data processing system, a first run in a first portion of the memory for the record;

determining, by the data processing system, the first run can be merged with a second run in a second portion of the memory based on both the first run and the second run comprising data records with a same count of the category or key;

in response to determining the first run can be merged with the second run, merging, by eagerly performing aggregation while sorting, the first run with the second run to create a third run;

releasing, by the data processing system, the first portion of the memory occupied by the first run and the second portion of the memory occupied by the second run;

determining, by the data processing system, no existing runs in the memory can be merged based on the count of the category or key;

determining, by the data processing system, whether a number of the existing runs in the memory is greater than one, wherein the existing runs include the third run;

in response to determining the number of existing runs in the memory is not greater than one, outputting, by the data processing system, a final aggregate result from the third run, wherein the final aggregate result represents final aggregate values for different categories or keys for the input data records; and in response to determining the number of existing runs in the memory is greater than one, merging, by the data processing system, all existing runs irrespective of the count of the category or key into a single run, and outputting, by the data processing system, the final aggregate result from the single run, wherein the final aggregate result represents the final aggregate values for different categories or keys for the input data records.

2. The method of claim 1, wherein the aggregate function is a composable aggregate function.

3. The method of claim 1, wherein the aggregate function is a SUM function or a COUNT function.

4. The method of claim 1, wherein the aggregate function is a MIN function or a MAX function.

5. The method of claim 1, wherein the eagerly performing aggregation while sorting comprises: (i) determining an aggregate value for each value in the category or key for the first run and the second run; (ii) storing the aggregate value in the third run, and (iii) sorting records of the third run based on the aggregate value determined for the category or key.

6. The method of claim 1, further comprising determining, by the data processing system, all records of the input data records are processed, wherein the determining whether the number of the existing runs in the memory is greater than one is performed in response to determining all the records of the input data records are processed.

7. A non-transitory computer-readable medium containing instructions that, when executed by a processor, causes the processor to:

receive a request to apply an aggregate function upon input data records for a particular field according to a group-by clause, wherein the group-by clause is based upon a category or key, and wherein the category or key is a value in another field of the input data records;

read a record of the input data records;

create a first run in a first portion of a memory for the record;

determine the first run can be merged with a second run in a second portion of the memory based on both the first run and the second run comprising data records with a same count of the category or key;

in response to determining the first run can be merged with the second run, merge, by eagerly performing aggregation while sorting, the first run with the second run to create a third run;

release the first portion of the memory occupied by the first run and the second portion of the memory occupied by the second run;

determine no existing runs in the memory can be merged based on the count of the category or key;

determine whether a number of the existing runs in the memory is greater than one, wherein the existing runs include the third run;

in response to determining the number of existing runs in the memory is not greater than one, output a final aggregate result from the third run, wherein the final aggregate result represents final aggregate values for different categories or keys for the input data records; and in response to determining the number of existing runs in the memory is greater than one, merge all existing runs irrespective of the count of the category or key into a single run, and output the final aggregate result from the single run, wherein the final aggregate result represents the final aggregate values for different categories or keys for the input data records.

8. The non-transitory computer-readable medium of claim 7, wherein the aggregate function is a composable aggregate function.

9. The non-transitory computer-readable medium of claim 7, wherein the aggregate function is a SUM function or a COUNT function.

10. The non-transitory computer readable medium of claim 7, wherein the aggregate function is a MIN function or a MAX function.

11. The non-transitory computer readable medium of claim 7, wherein the eagerly performing aggregation while sorting comprises: (i) determining an aggregate value for each value in the category or key for the first run and the second run; (ii) storing the aggregate value in the third run, and (iii) sorting records of the third run based on the aggregate value determined for the category or key.

12. The non-transitory computer readable medium of claim 7, wherein the processor is further caused to determine all records of the input data records are processed, wherein the determining whether the number of the existing runs in the memory is greater than one is performed in response to determining all the records of the input data records are processed.

13. A data processing system comprising:

one or more processors and associated memory, wherein the one or more processors are configured to:

receive a request to apply an aggregate function upon input data records for a particular field according to a group-by clause, wherein the group-by clause is based upon a category or key, and wherein the category or key is a value in another field of the input data records;

read a record of the input data records;

create a first run in a first portion of the memory for the record;

determine the first run can be merged with a second run in a second portion of the memory based on both the first run and the second run comprising data records with a same count of the category or key;

in response to determining the first run can be merged with the second run, merge, by eagerly performing aggregation while sorting, the first run with the second run to create a third run;

release the first portion of the memory occupied by the first run and the second portion of the memory occupied by the second run;

determine no existing runs in the memory can be merged based on the count of the category or key;

determine whether a number of the existing runs in the memory is greater than one, wherein the existing runs include the third run;

in response to determining the number of existing runs in the memory is not greater than one, output a final aggregate result from the third run, wherein the final aggregate result represents final aggregate values for different categories or keys for the input data records; and in response to determining the number of existing runs in the memory is greater than one, merge all existing runs irrespective of the count of the category or key into a single run, and output the final aggregate result from the single run, wherein the final aggregate result represents the final aggregate values for different categories or keys for the input data records.

14. The data processing system of claim 13, wherein the aggregate function is a composable aggregate function.

15. The data processing system of claim 13, wherein the aggregate function is a SUM function or a COUNT function.

16. The data processing system of claim 13, wherein the aggregate function is a MIN function or a MAX function.

17. The data processing system of claim 13, wherein the eagerly performing aggregation while sorting comprises: (i) determining an aggregate value for each value in the category or key for the first run and the second run; (ii) storing the aggregate value in the third run, and (iii) sorting records of the third run based on the aggregate value determined for the category or key.

18. The data processing system of claim 13, wherein the one or more processor are further configured to determine all records of the input data records are processed, wherein the determining whether the number of the existing runs in the memory is greater than one is performed in response to determining all the records of the input data records are processed.

* * * * *

UNITED STATES PATENT AND TRADEMARK OFFICE
CERTIFICATE OF CORRECTION

PATENT NO. : 11,169,999 B2
APPLICATION NO. : 16/854397
DATED : November 9, 2021
INVENTOR(S) : Mittal et al.

It is certified that error appears in the above-identified patent and that said Letters Patent is hereby corrected as shown below:

In the Specification

In Column 31, Line 3, delete "Google) Glass®." and insert -- Google Glass®). --, therefor.

Signed and Sealed this
Twenty-fourth Day of May, 2022

Katherine Kelly Vidal
Director of the United States Patent and Trademark Office